PHOTOELECTRIC CELL CIRCUIT

Filed June 3, 1950 3 Sheets-Sheet 1

INVENTORS.
Albert R. Squyer,
Paul F. Dirksen,
BY Brown, Jackson, Boettcher & Dienner
Attys.

Aug. 2, 1955 A. R. SQUYER ET AL 2,714,327

PHOTOELECTRIC CELL CIRCUIT

Filed June 3, 1950 3 Sheets-Sheet 2

INVENTORS.
Albert R. Squyer,
BY Paul F. Dirksen,
Brown, Jackson, Boettcher & Dienner
attys.

PHOTOELECTRIC CELL CIRCUIT

Filed June 3, 1950 3 Sheets-Sheet 3

INVENTORS
Albert R. Squyer,
BY Paul F. Dirksen,
Brown, Jackson, Boettcher & Dienner
Attys.

United States Patent Office 2,714,327

Patented Aug. 2, 1955

2,714,327

PHOTOELECTRIC CELL CIRCUIT

Albert R. Squyer and Paul F. Dirksen, Springfield, Ill., assignors to Weaver Manufacturing Company, Springfield, Ill., a corporation of Illinois Application June 3, 1950, Serial No. 165,962

21 Claims. (Cl. 88—14)

This invention relates, in general, to circuits for photoelectric cells of the flat plate or barrier layer type, and has particular relation to circuits involving a plurality of such cells in which the direction and magnitude of current flow depend upon a difference in the ratio of light intensities on the various cells.

The circuits which will be described hereinafter in connection with the drawings are adapted for use in testing headlights and the like, but it is to be understood that they are not limited to such use but may be employed for other purposes as suitable or desired.

One of the main objects of the present invention is to provide a sensitive and stable photoelectric cell circuit including a plurality of cells of the barrier layer type and a plurality of current responsive devices or instruments so arranged in the circuit as to be subjected to the differential action of the currents generated by the various cells.

Another object of the invention is to provide a common path for the flow of current from all of the cells so that a current responsive instrument may be inserted in such path to show a summation of the currents generated by all of the cells.

Another object of the invention is to achieve the same sensitivity to light intensity on part of the cells with respect to the other cells in different directions, with one-half the cell area exposed that has heretofore been required.

Another object of the invention is to provide a photoelectric cell circuit having four photoelectric cells of the barrier layer type arranged to provide first, second, third, and fourth pairs of such cells, with a conductive network having branches connecting like terminals of the cells, there being conductive connections between different pairs of branches of such network with current responsive devices in these conductive connections, resistances shunting the current responsive devices, and a conductive connection connecting a point on one resistance to a point on another resistance, which latter conductive connection is common to all of the photoelectric cells.

Another object of the invention is to provide with such an improved photoelectric cell circuit numerous other instrumentalities as will hereinafter appear.

Other objects and advantages, and numerous adaptations of the invention, will be apparent from the following detailed description and the accompanying drawings.

Figure 1:
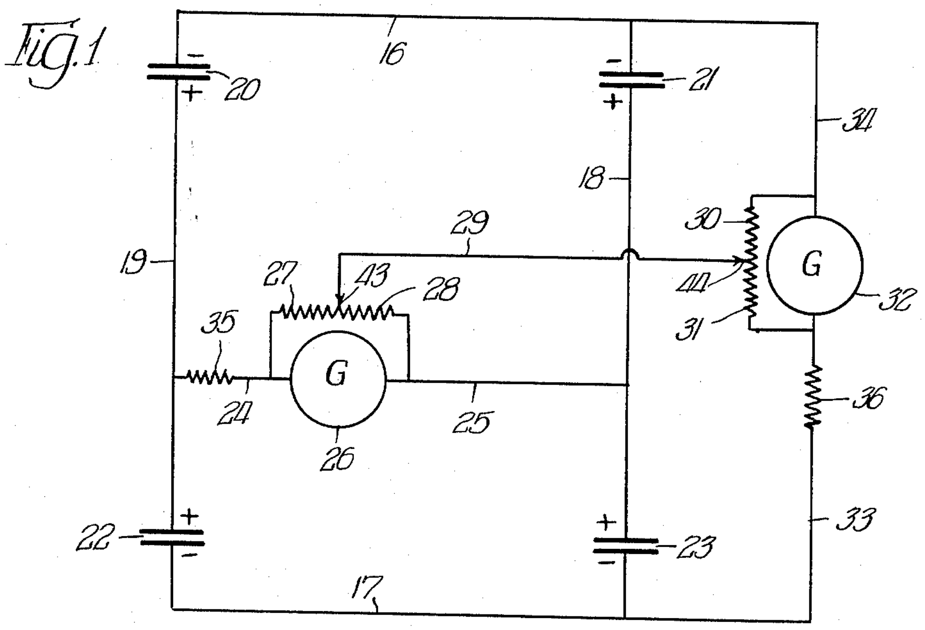
Figure 1 is a schematic circuit diagram of one form of photoelectric cell circuit embodying the present invention, using four cells and two current sensitive devices and associated resistances.

Referring now to the drawings, and particularly to Figures 1–4, four cells of the flat plate or barrier layer type are shown at 20, 21, 22, and 23.

The cells 20, 21, 22, and 23 are arranged to provide first, second, third and fourth pairs of cells. More particularly in the illustrated arrangement, cells 20 and 21 may be considered as an upper pair of cells, and cells 22 and 23 may be considered as a corresponding lower pair of cells. In the left right aspect, cells 20 and 22 may be considered as left pair of cells, and cells 21 and 23 may be considered as a right pair of cells. This is more clearly illustrated in Figure 3 wherein the four cells are shown in rectangular arrangement with a single light beam designated by the dotted oval 40 illuminating all four cells.

A conductive network has branches connecting like terminals of the cells. More particularly, the positive terminals of the left pair of cells 20 and 22 are connected together by a lead or conductive connection 19. The positive terminals of the right pair of cells 21 and 23 are connected together by a lead 18. The negative terminals of the upper pair of cells 20 and 21 are connected together by a lead 16. The negative terminals of the lower pair of cells 22 and 23 are connected together by a lead 17.

Figure 5:
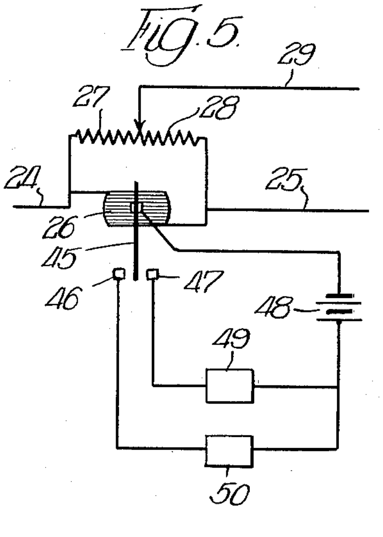
Figure 5 is a schematic portion of the circuit depicting one of the current sensitive devices as a relay with associated contacts, power source, and two power-operated devices.

The lead 19 connecting the positive terminals of cells 20 and 22 is connected by a lead 24 to one terminal of a current sensitive instrument 26 which, for example, is an instrument of the galvanometer type, or the current sensitive instrument 26 may be a current relay or the like. Such a relay as shown in Figure 5 has, for example, a contact arm 45 which is movable between its associated contacts 46 and 47 to close a circuit including an electric current or power source 48 and, respectively, power-operated devices 49 and 50. In this case the instrument 26 is shunted by resistances 27 and 28 connected together in series. The other terminal of instrument 26 is connected by a conductive connection or lead 25 to the lead 18 which connects the positive terminals of cells 21 and 23.

In Figure 1 the lead 16, which connects the negative terminals of the upper pair of cells 20 and 21, is connected to one terminal of a current sensitive instrument 32 which is of the same type as instrument 26, i. e., a galvanometer or a relay similar to the one shown in Figure 5. The lead 17 connecting the negative terminals of cells 22 and 23 is connected to the other terminal of the galvanometer or relay 32 by a conductive connection or lead 33. Resistances 30 and 31 which are connected together in series are shunted across the terminals of galvanometer or relay 32.

A lead 29 connects the junction of resistances 27 and 28 to the junction of resistances 30 and 31. Since the four cells 20, 21, 22, and 23 are of the barrier layer or so-called self-generating type, when they are illuminated an electric current will tend to flow from each cell's positive terminal to its negative terminal, and if a circuit is completed from positive to negative a current will flow.

Figure 4:
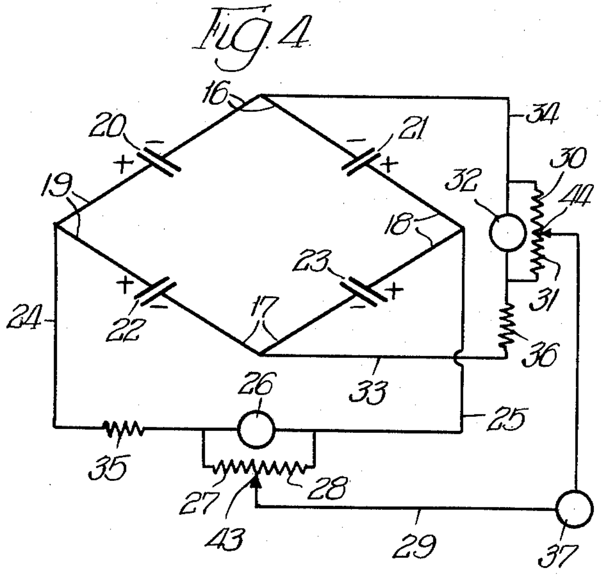
Figure 4 is a modified schematic circuit diagram of the photoelectric cell circuit depicted in Figure 1.

An examination of Figures 1 and 4 will reveal that in the case of cell 20 the circuit is completed from its positive terminal through lead 19, lead 24, resistance 27, lead 29, resistance 30, lead 34, and lead 16 to the negative terminal of cell 20. The circuit for cell 21 is completed from its positive terminal through lead 18, lead 25, resistance 28, lead 29, resistance 30, and lead 34 to the negative terminal of cell 21. The circuit for cell 22 is completed from its positive terminal through lead 19, lead 24, resistance 27, lead 29, resistance 31, lead 33, and lead 17 to the negative terminal of cell 22. The circuit for cell 23 is completed from its positive terminal through lead 18, lead 25, resistance 28, lead 29, resistance 31 and lead 33 to the negative terminal of cell 23.

It will be noted that lead 24 and resistance 27 are common to cells 20 and 22, and that lead 25 and resistance 28 are common to cells 21 and 23. It will also be noted that lead 34 and resistance 30 are common to cells 20 and 21, and that lead 33 and resistance 31 are common to cells 22 and 23.

Figure 2:
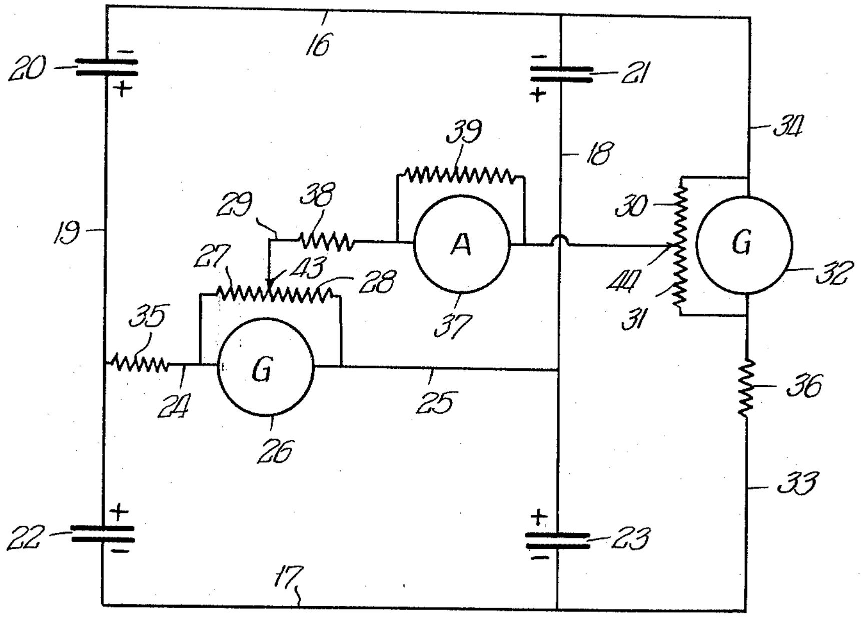
Figure 2 is a schematic circuit diagram similar to Figure 1, with the addition of a third current sensitive device and associated resistances inserted in a portion of the circuit common to all four cells.
Figure 3:
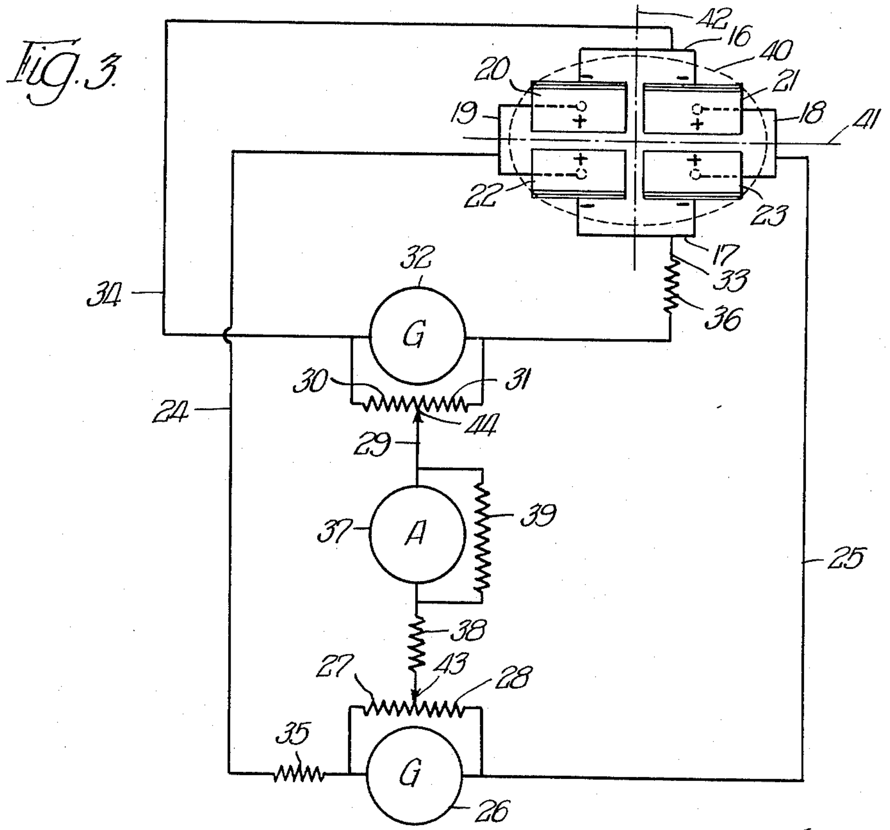
Figure 3 shows the four cells in rectangular arrangement, with the remainder of the circuit, including the current sensitive devices and associated resistances, as depicted in Figure 2.

It will be further noted that lead 29 is common to all four cells. In Figures 2, 3, and 4 an ammeter 37 is shown connected in this common lead 29 to indicate the current output of all four of the cells 20, 21, 22 and 23.

It is well known that the current output of cells of the barrier layer type varies directly with the illumination falling upon the cell. With an arrangement of cells as shown, for example, in Figure 3, with a beam of light (represented by the dotted outline 40) incident on the cells, the beam 40 is symmetrical about the horizontal and vertical center lines 41 and 42. Also the rectangular arrangement of the four cells 20, 21, 22, and 23 is symmetrical about the same center lines. Therefore the illumination from the beam 40 is the same on each of the four cells.

Should the light beam 40 be moved to the left with respect to the vertical center line 42 but not raised or lowered with respect to the horizontal center line 41 as the arrangement is viewed in Figure 3, then the left pair of cells—that is, cells 20 and 22—will receive more light than the right pair of cells 21 and 23. However, the upper pair of cells 20 and 21, considered as a pair, will still receive the same illumination as the companion lower pair of cells 22 and 23. Since there is more light on cells 20 and 22 as a pair than there is on cells 21 and 23 as a pair, the pair of cells 20 and 22 are emitting more current than the pair of cells 21 and 23. This statement, of course, is predicated on the assumption that thte cells are all four of like operating characteristics, and that each emits the same current from the same value of illumination.

Referring now to the circuit diagrams, Figures 1 and 4, with the illumination and current output on the left pair of cells 20 and 22 equal to that on the right pair of cells 21 and 23, and the resistances 27 and 28 equal to each other, there will be no current flow through the galvanometer 26. However, should the illumination be greater on the left pair of cells 20 and 22 than on the right pair 21 and 23, and therefore the current output greater on the left pair than on the right pair, a portion of the current from the left pair of cells 20 and 22 will flow through the resistance 27, and a portion of the current will flow through the galvanometer 26 and resistance 28. The galvanometer pointer will then be deflected from its normal central or null position.

Should the conditions be reversed—that is, the right pair of cells 21 and 23 receive more light than the left pair 20 and 22—the current flow through the galvanometer 26 will be reversed and the pointer will be deflected in the opposite direction.

It will also be evident from the circuit that in like manner, should the illumination be greater on the upper pair of cells 20 and 21 than on the lower pair of cells 22 and 23, the pointer of tthe galvanometer 32 will be deflected in one direction. Under reversed conditions—that is, with the illumination greater on the lower pair of cells 22 and 23 than on the upper pair of cells 20 and 21—, the pointer of the galvanometer 32 will be deflected in the opposite direction.

In general, it is difficult, or impractical, to choose four, or even two, photoelectric cells of the barrier layer type whose output characteristics are identical; that is, even though two cells are of the same design and area, their current outputs will not be equal for equal values of illumination. Therefore the resistances 27 and 28 can be chosen of such value with respect to each other that the pointer of thte galvanometer 26 will show nul when the illumination on the left pair of cells 20 and 22 is equal to the illumination on the right pair of cells 21 and 23.

An alternate method is to combine the resistances 27 and 28 into one resistance with the lead 29 connected to an adjustable tap at 43. This tap may thus be adjusted over the combined resistance 27 and 28 to balance current outputs from the left and right pairs of cells. In like manner the resistances 30 and 31 may be combined into one with an adjustable tap 44 connected to the lead 29, thus balancing the current outputs from the upper pair of cells 20 and 21, and the lower pair of cells 22 and 23.

Once the tap 43 has been adjusted to balance the current of the left pair and the right pair of cells for equal illumination on each pair; or, as an alternate method, the resistances 27 and 28 have been so chosen as to attain the same condition, and the tap 44 has been so adjusted or the resistances 30 and 31 so chosen as to balance the current output from the upper and lower pairs of cells for equal illumination on each pair of cells, any similar beam of light may be adjusted over the faces of the four cells 20, 21, 22, and 23 until the galvanometers 26 and 32 both indicate nul or zero. The four cells may be spaced farther apart for large beams of light, or closer together for smaller beams of light. Also, the four cells may be arranged on any surface or area, and other sources of illumination than a beam of light, such as flood lights, etc., may be so directed or arranged as to give equal illumination at the four points where the cells are located simply by adjusting the lights until the galvanometers indicate nul or zero.

It has been customary heretofore to use four photoelectric cells for the purpose outlined above by arranging the cells in two separate pairs, each pair with its own galvanometer. Thus one pair was used to indicate equal illumination left and right, and another pair was used to indicate equal illumination high and low.

In the photoelectric cell circuit according to the present invention, all four cells are used for each direction; a left pair and a right pair for the left right indication, and an upper pair and a lower pair of the same four cells are used to indicate the high and low. Thus the same degree of sensitivity may be attained with one half the cell area used in previous methods. Or, with the same cell area as used in formed methods, twice the sensitivity may be attained; or to attain the same sensitivity with the same cell area, galvanometers of lower sensitivity and therefore of more rugged construction, may be used.

Heretofore in the present specification we have considered the four cells 20, 21, 22 and 23 in the relation where the upper pair 20 and 21 have the same illumination, as a pair, as the lower pair 22 and 23, and where the left pair 20 and 22 have the same illumination, as a pair, as the right pair 21 and 23. However, should the illumination on the upper pair 20 and 21 be greater or less than that on the lower pair 22 and 23, the pointer of the galvanometer 32 may be set to indicate nul or zero values of resistances in 30 and 31, or by the adjustment of the center tap 44 as previously described.

In like manner the ratio of illumination on the left pair of cells 20 and 22 with respect to that on the right pair of cells 21 and 23 may be set at any desired ratio, and the galvanometer 26 may then be balanced to indicate nul by adjustment of the resistances 27 and 28.

Furthermore, the illumination on each of the four cells may be adjusted at a different value on each cell, and the two galvanometers 26 and 32 may be balanced to indicate nul for the particular ratio of illumination chosen. Even though the value of the illumination on cell 20 may be of a different value than that on cell 21, their respective currents from their negative terminals unite in the common lead 34 which is connected to one terminal of the galvanometer 32. The same is true of the respective currents from cells 22 and 23 which are joined through their common lead 33 to the other terminal of the galvanometer 32. In like manner, with the illumination different on each of the left pair of cells 20 and 22, the positive terminals of which are connected through their common lead 24 to one terminal of the galvanometer 26, and with different illumination on each of the right pair of cells 21 and 23, the positive terminals of which are connected through their common lead 25 to the other terminal of the galvanometer 26, the galvanometer 26 may be balanced to indicate nul by adjustment of the resistances 27 and 28, or by the adjustment of the center tap 43 along the combined resistances 27—28.

Once a desired ratio of the light intensities on each of the four cells 20, 21, 22 and 23 has been determined and the location of the center taps 43 and 44, or values of the resistances 27, 28, 30 and 31, has been determined to balance both galvanometers for such ratio of illumination, the said ratio of illumination may be duplicated accurately and expeditiously.

It is not necessary that the four cells be disposed in the rectangular arrangement shown in Figure 3. They may be arranged in any desired relation symmetrical or unsymmetrical, or at any distance from each other.

Figure 6:
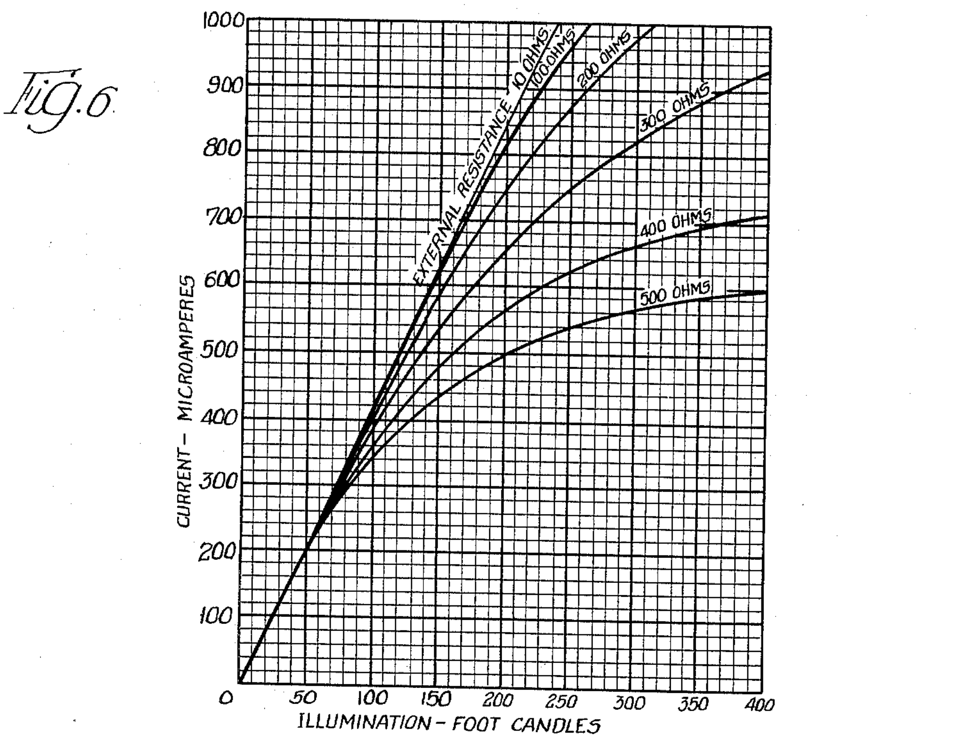
Figure 6 is a chart of typical output illumination curves for a representative photoelectric cell, with various resistances in the external circuit.

It is well known that in photoelectric cells of the barrier layer type, the current output of a given cell depends on the resistance in the cell's external circuit. Referring to Figure 6, we have there shown the current output in microamperes of a given cell for varying degrees of illumination in foot candles at different amounts of resistance in the cell's external circuit. It will be noted that the greater the resistance, the less the current output for a given illumination.

Figure 7:
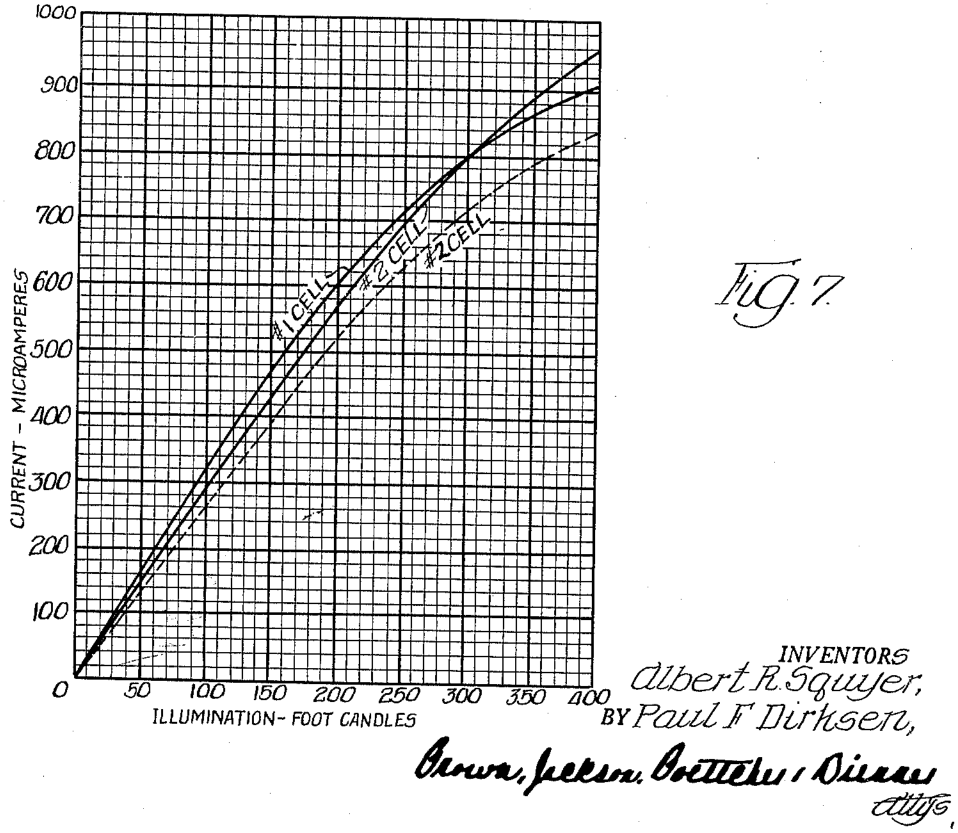
Figure 7 is a chart of output-illumination curves of two representative cells having different output illumination characteristics and the effect of higher external resistance in one of the cells.

It is also well known that the current outputs of two cells from the same manufacturer, identical in shape and area, will vary in current output for the same illumination and external circuit resistance. This is illustrated in Figure 7. Here cell No. 1 and cell No.2 are equal in output at 300 foot candles illumination, but are different at all other illuminations. Both cells in this case have the same external resistance. However, the resistance in the circuit of cell No. 2 can be increased until it has the same degree of variation as shown by the dotted curve for cell No. 2. In the circuit which has been presented heretofore in the present specification, such a condition might exist when the left pair of cells 20 and 22 (Figures 1–4) is balanced against the right pair of cells 21 and 23 at any given illumination—say, 300 foot candles.

At lower degrees of illumination the current output of the left pair of cells 20 and 22 may be less. In such a case, the external resistance of such left pair may be increased by the insertion of a resistance 35 in the lead 24. It would then be necessary to balance the galvanometer 26 to nul by readjusting the tap 43 along the combined resistance 27 and 28, or by changing the values of resistances 27 and/or 28 as may be necessary. When the resistance 35 is of the proper value and the values of combined resistance or resistances 27 and 28 are in the proper relation to each other, the pointer of the galvanometer 26 will remain nul or zero for all values of illumination. It may be necessary to insert the resistance 35 in the lead 25 instead of the lead 24, should the cell characteristics require it.

In like manner the output of the upper pair of cells 20 and 21 may be balanced against the output of the lower pair of cells 22 and 23 for all values of illumination by the insertion of a resistance 36 of the proper value in the lead 33 or 34, as required, and the readjustment of the values of the combined resistance or resistances 30 and 31 to bring the pointer of the galvanometer 32 to nul or zero.

The output-illumination curve for any cell is very seldom linear, or a straight line, but is curved as shown in Figure 6, since in this type of circuit it is impossible to have no external resistance. By preliminary tests of several pairs of cells of the same manufacture, type, size, area, and external resistance, it is possible to find the pairs in which the output illumination curve is curved the most. The scale on the total output meter 37, designated in foot candles or other suitable units of illumination (Figures 2 and 3), can then be drawn to fit these cells with the shunt resistance 39 adjusted to give full scale reading for the maximum illumination expected or desired. Should other cell characteristics be such that the output-illumination curve is straighter than the curve translated on the scale of meter 37, a series resistance 38 may be inserted in the lead 29 (Figure 2) of such value that when the shunt resistance 39 is of the proper value the meter 37 will read the correct light intensity for all degrees of illumination to which the entire group of four cells is expected to be illuminated.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

We claim:

1. In a photoelectric cell circuit, in combination, four photoelectric cells of the barrier layer type arranged to provide first, second, third, and fourth pairs of said cells, a conductive network having branches connecting like terminals of said cells, a first conductive connection between one pair of branches of said network, a second conductive connection between another pair of branches of said network, a first current responsive device in circuit with said first conductive connection, a second current responsive device in circuit with said second conductive connection, a first resistance shunting said first current responsive device, a second resistance shunting said second current responsive device, a third conductive connection connecting a point on said first resistance to a point on said second resistance, said third conductive connection being common to all of said photoelectric cells, and an output meter in circuit with the third conductive connection common to all of the photoelectric cells.

2. In a photoelectric cell circuit, in combination, four photoelectric cells of the barrier layer type arranged to provide first, second, third, and fourth pairs of said cells, a conductive network having branches connecting like terminals of said cells, a first conductive connection between one pair of branches of said network, a second conductive connection between another pair of branches of said network, a first current responsive device in circuit with said first conductive connection, a second current responsive device in circuit with said second conductive connection, a first resistance shunting said first current responsive device, a second resistance shunting said second current responsive device, a third conductive connection connecting a point on said first resistance to a point on said second resistance, said third conductive connection being common to all of said photoelectric cells, a output meter in circuit with the third conductive connection common to all of the photoelectric cells, and a resistance in series with said output meter.

3. In a photoelectric cell circuit, in combination, four photoelectric cells of the barrier layer type arranged to provide first, second, third, and fourth pairs of said cells, a conductive network having branches connecting like terminals of said cells, a first conductive connection between one pair of branches of said network, a second conductive connection between another pair of branches of said network, a first current responsive device in circuit with said first conductive connection, a second current responsive device in circuit with said second conductive connection, a first resistance shunting said first current responsive device, a second resistance shunting said second current responsive device, a third conductive connection connecting a point on said first resistance to a point on said second resistance, said third conductive connection being common to all of said photoelectric cells, an output meter in circuit with the third conductive connection common to all of the photoelectric cells, and a third resistance shunting said output meter.

4. In a photoelectric cell circuit, in combination, four photoelectric cells of the barrier layer type arranged to provide first, second, third and fourth pairs of cells, said third pair of cells including one cell of said first pair and one cell of said second pair, said fourth pair of cells including the other cell of said first pair and the other cell of said second pair, a first conductive connection connecting like terminals of said first pair of cells, a second conductive connection connecting like terminals of said second pair of cells, said like terminals of said second pair of cells being of the same polarity as said like terminals of said first pair of cells, a first current responsive device connected between said first and second conductive connections to subject said first current responsive device to the differential action of currents generated by said first and second pairs of cells, a third conductive connection connecting like terminals of said third pair of cells, a fourth conductive connection connecting like terminals of said fourth pair of cells, said like terminals of said fourth pair of cells being of the same polarity as said like terminals of said third pair of cells and of opposite polarity to said like terminals of said first and second pairs of cells, a second current responsive device connected between said third and fourth conductive connections to subject said second current responsive device to the differential action of current generated by said third and fourth pairs of cells, a first resistance shunting said first current responsive device, a second resistance shunting said second current responsive device, and a circuit element connecting a point on said first resistance to a point on said second resistance, said circuit element being common to all four photoelectric cells, the circuit element connecting a point on the first resistance to a point on the second resistance and common to all four photoelectric cells including a third current responsive device as a part of said circuit element.

5. In a photoelectric cell circuit, in combination, four photoelectric cells of the barrier layer type arranged to provide first, second, third and fourth pairs of cells, said third pair of cells including one cell of said first pair and one cell of said second pair, said fourth pair of cells including the other cell of said first pair and the other cell of said second pair, a first conductive connection connecting like terminals of said first pair of cells, a second conductive connection connecting like terminals of said second pair of cells, said like terminals of said second pair of cells being of the same polarity as said like terminals of said first pair of cells, a first current responsive device connected between said first and second conductive connections to subject said first current responsive device to the differential action of currents generated by said first and second pairs of cells, a third conductive connection connecting like terminals of said third pair of cells, a fourth conductive connection connecting like terminals of said fourth pair of cells, said like terminals of said fourth pair of cells being of the same polarity as said like terminals of said third pair of cells and of opposite polarity to said like terminals of said first and second pairs of cells, a second current responsive device connected between said third and fourth conductive connections to subject said second current responsive device to the differential action of current generated by said third and fourth pairs of cells, a first resistance shunting said first current responsive device, a second resistance shunting said second current responsive device, and a circuit element connecting a point on said first resistance to a point on said second resistance, said circuit element being common to all four photoelectric cells, the circuit element connecting a point on the first resistance to a point on the second resistance and common to all four photoelectric cells including a current measuring instrument as a part of said circuit element.

6. In a photoelectric cell circuit, in combination, four photoelectric cells of the barrier layer type arranged to provide first, second, third and fourth pairs of cells, said third pair of cells including one cell of said first pair and one cell of said second pair, said fourth pair of cells including the other cell of said first pair and the other cell of said second pair, a first conductive connection connecting like terminals of said first pair of cells, a second conductive connection connecting like terminals of said second pair of cells, said like terminals of said second pair of cells being of the same polarity as said like terminals of said first pair of cells, a first current responsive device connected between said first and second conductive connections to subject said first current responsive device to the differential action of currents generated by said first and second pairs of cells, a third conductive connection connecting like terminals of said third pair of cells, a fourth conductive connection connecting like terminals of said fourh pair of cells, said like terminals of said fourth pair of cells being of the same polarity as said like terminals of said third pair of cells and of opposite polarity to said like terminals of said first and second pairs of cells, a second current responsive device connected between said third and fourth conductive connections to subject said second current responsive device to the differential action of current generated by said third and fourth pairs of cells, a first resistance shunting said first current responsive device, a second resistance shunting said second current responsive device, a circuit element connecting a point on said first resistance to a point on said second resistance, said circuit element being common to all four photoelectric cells, the circuit element connecting a point on the first resistance to a point on the second resistance and common to all four photoelectric cells including a third current responsive device as a part of said circuit element, and a resistance shunting the third current responsive device.

7. In a photoelectric cell circuit, in combination, four photoelectric cells of the barirer layer type arranged to provide first, second, third and fourth pairs of cells, said third pair of cells including one cell of said first pair and one cell of said second pair, said fourth pair of cells including the other cell of said first pair and the other cell of said second pair, a first conductive connection connecting like terminals of said first pair of cells, a second conductive connection connecting like terminals of said second pair of cells, said like terminals of said second pair of cells being of the same polarity as said like terminals of said first pair of cells, a first current responsive device connected between said first and second conductive connections to subject said first current responsive device to the differential action of currents generated by said first and second pairs of cells, a third conductive connection connecting like terminals of said third pair of cells, a fourth conductive connection connecting like terminals of said fourth pair of cells, said like terminals of said fourth pair of cells being of the same polarity as said like terminals of said third pair of cells and of opposite polarity to said like terminals of said first and second pairs of cells, a second current responsive device connected between said third and fourth conductive connections to subject said second current responsive device to the differential action of current generated by said third and fourth pairs of cells, a first resistance shunting said first current responsive device, a second resistance shunting said second current responsive device, a circuit element connecting a point on said first resistance to a point on said second resistance, said circuit element being common to all four photoelectric cells, the circuit element connecting a point on the first resistance to a point on the second resistance and common to all four photoelectric cells including a third current responsive device as a part of said circuit element, and a resistance connected in series with said third current responsive device.

8. In a photoelectric cell circuit, in combination, four photoelectric cells of the barrier layer type arranged to provide first, second, third and fourth pairs of cells, said third pair of cells including one cell of said first pair and one cell of said second pair, said fourth pair of cells including the other cell of said first pair and the other cell of said second pair, a first conductive connection connecting like terminals of said first pair of cells, a second conductive connection connecting like terminals of said second pair of cells, said like terminals of said second pair of cells being of the same polarity as said like terminals of said first pair of cells, a first current responsive device connected between said first and second conductive connections to subject said first current responsive device to the differential action of currents generated by said first and second pairs of cells, a third conductive connection connecting like terminals of said third pair of cells, a fourth conductive connection connecting like terminals of said fourth pair of cells, said like terminals of said fourth pair of cells being of the same polarity as said like terminals of said third pair of cells and of opposite polarity to said like terminals of said first and second pairs of cells, a second current responsive device connected between said third and fourth conductive connections to subject said second current responsive device to the differential action of current generated by said third and fourth pairs of cells, a first resistance shunting said first current responsive device, a second resistance shunting said second current responsive device, a circuit element connecting a point on said first resistance to a point on said second resistance, said circuit element being common to all four photoelectric cells, the circuit element connecting a point on the first resistance to a point on the second resistance and common to all four photoelectric cells including a third current responsive device as a part of said circuit element, a resistance shunting the third current responsive device, and another resistance connected in series with said third current responsive device.

9. In apparatus for photoelectric measurement and the like, the combination of four photoelectric cells of the barrier layer type and arranged to provide first, second, third, and fourth pairs of cells, a first current responsive device, circuit elements including a first resistance connecting said first device to a first pair of cells and a second pair of cells, a second current responsive device, circuit elements including a second resistance connecting said second device to a third pair and a fourth pair of said cells, said third pair of cells including one cell of said first pair and one cell of said second pair, said fourth pair of cells including the other cell of said first pair and the other cell of said second pair, and a circuit element connecting said first resistance to said second resistance, said circuit elements combining to influence said first device in accordance with the difference in current outputs of said first and second pairs of said cells and to influence said second device in accordance with the difference in current outputs of said third and fourth pairs of cells, the circuit element connecting the first resistance to the second resistance being common to all four photoelectric cells and including a third current responsive device.

10. In a photoelectric cell circuit, in combination, four photoelectric cells of the barrier layer type arranged to provide an upper pair of cells, a lower pair of cells, a left hand pair of cells and a right hand pair of cells, one of said upper pair of cells constituting one of the left-hand pair of cells and the other upper cell constituting one of the right hand pair of cells, one of said lower pair of cells constituting the other left hand cell and the other lower cell constituting the other right hand cell, a first conductive connection between like terminals of said left hand pair of cells, a second conductive connection between like terminals of said right hand pair of cells, a third conductive connection between like terminals of said upper pair of cells, a fourth conductive connection between like terminals of said lower pair of cells, a fifth conductive connection connecting said first and second conductive connections and having a first current responsive device in circuit therewith, a sixth conductive connection connecting said third and fourth conductive connections and having a second current responsive device in circuit therewith, a first shunt connection connected to said fifth conductive connection around said first current responsive device, a second shunt connection connected to said sixth conductive connection around said second current responsive device, and a conductive connection between said first and second shunt connections and common to all four photoelectric cells.

11. A photoelectric cell circuit according to claim 10 wherein there are resistances in the first and second shunt connections on opposite sides of the connections of the common conductive connection therewith and of such values as to balance the current output from the upper and lower pair of cells and the current output from the left hand and right hand pair of cells for equal illumination on all pairs of cells.

12. A photoelectric cell circuit according to claim 10 wherein there is a resistance in circuit with said fifth conductive connection and between said first conductive connection and said first shunt connection and another resistance in circuit with said sixth conductive connection and between said fourth conductive connection and said second shunt connection.

13. A photoelectric cell circuit according to claim 10 wherein there are resistances in the first and second shunt connections on opposite sides of the connections of the common conductive connection therewith and of such values as to balance the current output from the upper and lower pair of cells and the current output from the left hand and right hand pair of cells for equal illumination on all pairs of cells; also a resistance in circuit with said fifth conductive connection and between said first conductive connection and said first shunt connection and another resistance in circuit with said sixth conductive connection and between said four conductive connection and said second shunt connection.

14. A photoelectric cell circuit according to claim 10 wherein there is a resistance in circuit with said fifth conductive connection and between one of said first and second conductive connections and said first shunt connection and another resistance in circuit with said sixth conductive connection and between one of said third and fourth conductive connections and said second shunt connection.

15. In a photoelectric cell circuit, in combination, four photoelectric cells of the barrier layer type arranged to provide an upper pair of cells, a lower pair of cells, a left-hand pair of cells and a right-hand pair of cells, one of said upper pair of cells constituting one of the left-hand pair of cells and the other upper cell constituting one of the right-hand pair of cells, one of said lower pair of cells constituting the other left-hand cell and the other lower cell constituting the other right-hand cell, a first conductive connection between like terminals of said left-hand pair of cells, a second conductive connection between like terminals of said right-hand pair of cells, a third conductive connection between like terminals of said upper pair of cells, a fourth conductive connection between like terminals of said lower pair of cells, a fifth conductive connection connecting said first and second conductive connections and having a first current responsive device in circuit therewith, a sixth conductive connection connecting said third and fourth conductive connections and having a second current responsive device in circuit therewith, said fifth conductive connection being connected on opposite sides of said first current responsive device with said sixth conductive connection on opposite sides of said second current responsive device by a conductive connection common to all four photoelectric cells, said fifth conductive connection on one side of said first current responsive device being common to both cells of said first pair of cells and on the opposite side of said first current responsive device being common to both cells of said second pair of cells to indicate on said first current responsive device any differential in the current outputs from said first and second pairs of cells, and said sixth conductive connection on one side of said second current responsive device being common to both cells of said third pair of cells and on the opposite side of said second current responsive device being common to both cells of said fourth pair of cells to indicate on said second current responsive device any differential in the current output from said third and fourth pairs of cells.

16. A photoelectric cell circuit according to claim 15 wherein there is a resistance in at least one of said common sides of said fifth and sixth conductive connections.

17. A photoelectric cell circuit according to claim 15 wherein there is a first resistance in one of the common sides of said fifth conductive connection and a second resistance in one of the common sides of said sixth conductive connection.

18. In a device for determining the focusing of a light beam, in combination, four photoelectric cells arranged to provide first, second, third and fourth pairs of cells and each of a character to generate electric current by illumination thereof, a conductive network including all four of said cells and connecting said first and second pairs of cells in electrically opposed relation, and said third and fourth pairs of cells in electrically opposed relation, a first current responsive device in said conducting network and connected to indicate by the action of the combined voltages of the two cells of said first pair of cells in opposition to the combined voltages of the two cells of said second pair of cells any current flow through said first current responsive device and the direction thereof, and a second current responsive device in said conducting network and connected to indicate by the action of the combined voltages of the two cells of said third pair of cells in opposition to the combined voltages of the two cells of said fourth pair of cells any current flow through said second current responsive device and the direction thereof.

19. In a device for determining the focusing of a light beam, in combination, four photoelectric cells arranged to provide first, second, third and fourth pairs of cells and each of a character to generate electric current by illumination thereof, a conductive network including all four of said cells and connecting said first and second pairs of cells in electrically opposed relation, and said third and fourth pairs of cells in electrically opposed relation, a first current responsive device in said conductive network and connected to indicate by the action of the combined voltages of the two cells of said first pair of cells in opposition to the combined voltages of the two cells of said second pair of cells any current flow through said first current responsive device and the direction thereof, a second current responsive device in said conductive network and connected to indicate by the action of the combined voltages of the two cells of said third pair of cells in opposition to the combined voltages of the two cells of said fourth pair of cells any current flow through said second current responsive device and the direction thereof, said first and second pairs of cells being disposed about a horizontal axis of symmetry, and said third and fourth pairs of cells being disposed about a vertical axis of symmetry.

20. In a device for determining the focusing of a light beam, in combination, four photoelectric cells arranged to provide first, second, third and fourth pairs of cells and each of a character to generate electric current by illumination thereof, a conductive network including all four of said cells and connecting said first and second pairs of cells in electrically opposed relation, and said third and fourth pairs of cells in electrically opposed relation, a first current responsive device in said conductive network and connected to indicate by the action of the combined voltages of the two cells of said first pair of cells in opposition to the combined voltages of the two cells of said second pair of cells any current flow through said first current responsive device and the direction thereof, a second current responsive device in said conductive network and connected to indicate by the action of the combined voltages of the two cells of said third pair of cells in opposition to the combined voltages of the two cells of said fourth pair of cells any current flow through said second current responsive device and the direction thereof, said conductive network including a lead connection affording a common current path for all four of said cells, and current responsive means in said common path and operative to show a summation of the currents generated by all four of said cells.

21. In a device for determining the focusing of a light beam, in combination, four photoelectric cells arranged to provide first, second, third and fourth pairs of cells and each of a character to generate electric current by illumination thereof, a conductive network including all four of said cells and connecting said first and second pairs of cells in electrically opposed relation, and said third and fourth pairs of cells in electrically opposed relation, a first current responsive device in said conductive network and connected to indicate by the action of the combined voltages of the two cells of said first pair of cells in opposition to the combined voltages of the two cells of said second pair of cells any current flow through said first current responsive device and the direction thereof, a second current responsive device in said conductive network and connected to indicate by the action of the combined voltages of the two cells of said third pair of cells in opposition to the combined voltages of the two cells of said fourth pair of cells any current flow through said second current responsive device and the direction thereof, and means for balancing the current outputs from said first and second pairs of cells and the current outputs from said third and fourth pairs of cells.

References Cited in the file of this patent

UNITED STATES PATENTS

| | | |
|---|---|---|
| 2,019,871 | Pettingill et al. | Nov. 5, 1935 |
| 2,244,826 | Cox | June 10, 1941 |
| 2,291,114 | Squyer | July 28, 1942 |
| 2,308,095 | Meeder | Jan. 12, 1943 |